Patented Apr. 18, 1939

2,154,709

UNITED STATES PATENT OFFICE 2,154,709

POLYNUCLEAR ARYL THIOISATINS

Alvin J. Sweet, East Aurora, N. Y., assignor to National Aniline & Chemical Company, Inc., New York, N. Y., a corporation of New York No Drawing. Application March 4, 1936, Serial No. 67,078

10 Claims. (Cl. 260—330)

This invention relates to new and useful compounds which are valuable intermediates for the manufacture of dyestuffs, particularly dyestuffs of the asymmetrical thiondigoid type.

The new compounds of the present invention are thioisatin anils which may be typified by the general structural formula

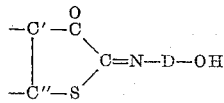

wherein C' and C'' are adjacent carbon atoms of a condensed polynuclear aromatic radical, and D represents an aromatic radical. The condensed polynuclear radical of which the carbon atoms represented by C' and C'' are a part may be, for example, a naphthalene radical, an anthracene radical, an anthraquinone radical, etc.; the radical may be unsubstituted or may be further substituted by one or more halogen atoms and/or one or more alkyl, hydroxy, alkoxy, aryloxy, aralkyl, alkaryl or carboxyl groups. The aromatic radical represented by D may be mononuclear or polynuclear; it may be unsubstituted or may be further substituted by one or more halogen atoms and/or one or more alkyl, hydroxy, alkoxy, aryloxy, aralkyl, alkaryl or carboxyl groups. The compounds above described may be prepared in accordance with this invention by condensing a thioindoxyl compound typified by the structural formula

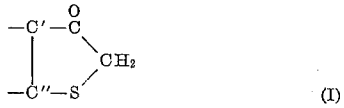

with a nitroso compound typified by the structural formula $$O=N-D-OH \qquad (II)$$

wherein the letters C', C'', and D have the significance above indicated, with the aid of a condensing agent, preferably sodium hydroxide.

The following example exemplifies the process whereby the compounds of this invention may be prepared, the parts referred to therein being by weight:

Example: 20 parts of 2,1-naphthothioindoxyl, having the formula

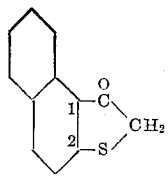

were dissolved in 1060 parts of a 3 per cent solution of caustic soda. The temperature of the solution was adjusted to between about 40° C. and 50° C. and 10 parts of p-nitrosophenol were added thereto. The mixture was vigorously agitated at the above temperature for about 1 hour when the reaction was adjudged complete, as indicated by the fact that a test sample of the mixture no longer yielded a deep brown colored product upon oxidation with a solution of an oxidizing agent, e. g., potassium ferrocyanide. Common salt was then added to the mixture until the solution was colored a faint pink. The precipitated product was separated by filtration, dissolved in water and reprecipitated by the addition of hydrochloric acid to the solution. The mixture which resulted was filtered and the solid product which remained upon the filter was thoroughly washed with cold water until it was free from acid or other water soluble impurities and was then dried, preferably in vacuo.

The resulting product, which is the para-hydroxyanil of 2,1-naphthothioisatin, and corresponds to the following formula:

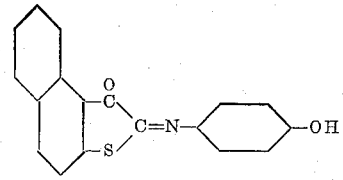

was a brown crystalline compound, somewhat soluble in dilute caustic soda, yielding a solution having an intense violet color. It dissolved in benzol to yield a yellow solution, and upon recrystallization from an alcoholic solution, it was obtained as red-brown needle-like crystals which melted with some decomposition between about 270° C. and about 275° C.

It will be understood that the process of this invention is not limited to the above disclosure and that changes may be made therein without exceeding the scope of the invention. For example, in place of caustic soda as the condensation reagent, other substances may be used, such as caustic potash, alkali metal carbonates and alkaline-earth-metal hydroxides. Furthermore, in place of water, other suitable media may be used provided they do not decompose or react with the components of the reaction. Examples of such solvents are alcohol, acetic acid or the like. When glacial acetic acid is used as the solvent, no additional condensing agent is necessary.

Considerable latitude is also permissible with respect to the temperature at which the condensation reaction takes place, it having been found that in general the rate of condensation increases with increased temperature of the reaction mixture. Usually a temperature between about 15° C. and about 50° C. is sufficient to accomplish rapid reaction, and preferably a temperature between about 40° C. and about 50° C. is used.

Other compounds of the type represented by structural Formula I above, to which the present invention is applicable are exemplified by 2,1 anthrathioindoxyl

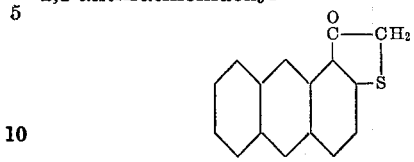

2,1 anthraquinothioindoxyl

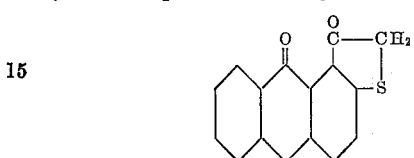

2,3 naphthothioindoxyl

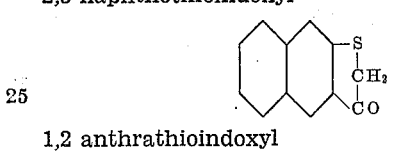

1,2 anthrathioindoxyl

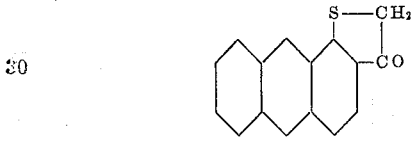

etc., and other compounds of the type represented by structural Formula II which may be used in place of para-nitrosophenol are nitroso-methoxyphenol, nitroso-cresols, nitroso-xylols, nitroso-naphthols, etc.

In the claims, the term "hydrocarbon radical of the benzene series" means a radical of benzene or of a homologue of benzene; and the term "hydrocarbon radical of the naphthalene series" means a radical of naphthalene or of a homologue of naphthalene.

The compounds of this invention have properties which make them extremely advantageous as intermediates in the manufacture of vat dyestuffs. For example, the anils of the present invention prepared from 2,1-naphthothioindoxyl and para-nitrosophenol are obtainable in much higher yields and may be hydrolyzed much more easily and efficiently than the corresponding anils prepared from 2,1-naphthothioindoxyl and para-nitrosodimethyl aniline which have heretofore been used in the art. They are much more easily purified by crystallization from aqueous solution owing to the fact that they are more easily soluble therein than the corresponding anils heretofore used. Due to the greater ease of hydrolysis, the anils of this invention constitute much more reactive intermediates for reacting with suitable coupling compounds and consequently are much more advantageous for the manufacture of thioindigoid dyes, particularly dyes of an asymmetrical nature, than the compounds which have heretofore been used.

I claim:
1. The chemical compounds which may be typified by the general formula

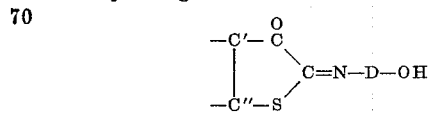

wherein C' and C" are adjacent carbon atoms of a polynuclear aryl radical selected from the group consisting of naphthalene, anthracene, anthraquinone and homologous radicals, D represents an aryl hydrocarbon radical of the benzene series, and the hydroxyl group is in the para-position to the nitrogen atom.

2. The chemical compounds having the following general formula:

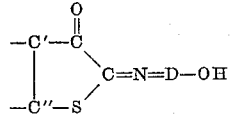

wherein C' and C" are adjacent carbon atoms of a condensed polynuclear aryl hydrocarbon radical D represents an aryl hydrocarbon radical of the benzene series, and the hydroxyl group is in the para-position to the nitrogen atom.

3. The chemical compounds having the following general formula:

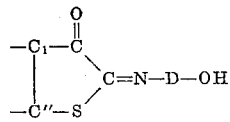

wherein C' and C" are adjacent carbon atoms of an aryl hydrocarbon radical of the naphthalene series, D represents an aryl hydrocarbon radical of the benzene series, and the hydroxyl group is in the para-position to the nitrogen atom.

4. The para-hydroxyanil of 2,1-naphthothioisatin, being a crystalline compound somewhat soluble in dilute caustic soda to form a solution having an intense violet color, and corresponding to the formula

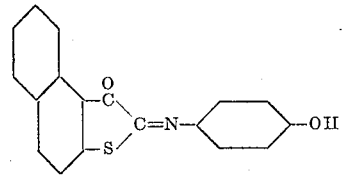

5. A method of manufacturing anil compounds of the type described, which comprises condensing a thioindoxyl compound typified by the structural formula

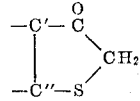

wherein C' and C" are adjacent carbon atoms of a polynuclear aryl radical selected from the group consisting of naphthalene, anthracene, anthraquinone and homologous radicals, with a nitroso compound typified by the structural formula O=N—D—OH, wherein D represents an aromatic hydrocarbon radical of the benzene series, and the hydroxyl group is in the para-position to the nitrogen atom.

6. A method of manufacturing anil compounds of the type described, which comprises condensing a thioindoxyl compound typified by the structural formula

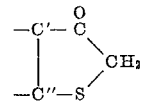

wherein C' and C" are adjacent carbon atoms of a condensed polynuclear aryl hydrocarbon radical of the naphthalene series, with para-nitrosophenol, wtih the aid of a caustic alkali as condensing agent.

7. A method of manufacturing anil compounds of the type described, which comprises condensing a thioindoxyl compound typified by the structural formula:

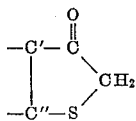

wherein C' and C'' are adjacent carbon atoms of a condensed polynuclear aryl hydrocarbon radical, with a nitroso compound typified by the structural formula, O=N—D—OH, wherein D represents an aryl hydrocarbon radical of the benzene series, and the hydroxyl group is in the para-position to the nitrogen atom.

8. A method of manufacturing anil compounds of the type described, which comprises condensing a thioindoxyl compound typified by the structural formula:

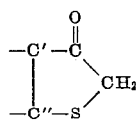

wherein C' and C'' are adjacent carbon atoms of an aryl hydrocarbon radical of the naphthalene series, with a nitroso compound typified by the structural formula, O=N—D—OH, wherein D represents an aryl hydrocarbon radical of the benzene series, and the hydroxyl group is in the para-position to the nitrogen atom, in the presence of an aqueous solution of a caustic alkali and at a temperature between about 15° C. and about 50° C.

9. A method of manufacturing anil compounds of the type described, which comprises condensing a thioindoxyl compound typified by the structural formula:

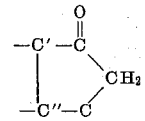

wherein C' and C'' are adjacent carbon atoms of an aryl hydrocarbon radical of the naphthalene series, with para-nitrosophenol in the presence of an aqueous solution of caustic soda and at a temperature between about 15° C. and about 50° C.

10. A method for the manufacture of the para-hydroxyanil of 2,1 naphthothioisatin, which comprises condensing 2,1-naphthothioindoxyl with para-nitrosophenol, with the aid of caustic soda in an aqueous medium and at a temperature between about 15° C. and about 50° C.

ALVIN J. SWEET.